United States Patent [19]

Clausen

[11] 4,039,692
[45] Aug. 2, 1977

[54] INTERMEDIATE-MOISTURE ANIMAL FOOD PROCESS

[75] Inventor: Edward Einar Clausen, Armonk, N.Y.

[73] Assignee: General Foods Corporation, White Plains, N.Y.

[21] Appl. No.: 519,903

[22] Filed: Nov. 1, 1974

[51] Int. Cl.² .......................... A23K 1/10; A23B 4/14
[52] U.S. Cl. .................................... 426/532; 426/641; 426/646; 426/438; 426/805
[58] Field of Search ............... 426/438, 532, 657, 658, 426/805, 439, 646, 641, 99

[56] References Cited

U.S. PATENT DOCUMENTS

| | | | |
|---|---|---|---|
| 3,188,214 | 6/1965 | Harper | 426/438 |
| 3,202,514 | 8/1965 | Burgess et al. | 426/532 |
| 3,741,774 | 6/1973 | Burkwall | 426/658 X |

*Primary Examiner*—Raymond N. Jones
*Assistant Examiner*—Esther L. Massung
*Attorney, Agent, or Firm*—Thaddius J. Carvis; Bruno P. Struzzi; Daniel J. Donovan

[57] ABSTRACT

Shelf-stable intermediate-moisture animal or pet foods are cooked by subjecting them to deep fat frying.

13 Claims, No Drawings

INTERMEDIATE-MOISTURE ANIMAL FOOD PROCESS

BACKGROUND OF THE INVENTION

This invention relates to intermediate-moisture foods and more particularly to a process for preparing intermediate-moisture animal or pet foods.

Intermediate-moisture or soft moist animal foods are well-known in the art and have achieved significant success in the market. Typically, these products will contain from 15 to 60% moisture by weight and yet are resistant to microbial or bacterial decomposition due to the presence of a sufficient amount of solute material which effects a rise in the osmotic pressure of the water in which they are dissolved to achieve bacteriostasis. It is also commonplace to add an antimicrobial material to insure that the product is kept in a bacteriologically free state.

The meaty and/or vegetable materials which comprise the basic matric for intermediate-moisture animal or pet foods must be cooked to some degree to obtain a pasteurization or initial kill of any bacteria present in the source components. Generally, the art has resorted to techniques such as autoclave, extrusion cooking, steam retorting, and the like to achieve this degree of cook. It is recognized in the art, however, that too extensive a retention time in any cooking apparatus or utilization of stringent temperature and pressure conditions for the cooking may result in the decreased palatability of these products.

Deep fat frying of course is well-known in the art and possesses certain known advantages, especially in the speed with which the cooking can be achieved. However, such a process has not been heretofore proposed in the production of intermediate-moisture shelf-stable products. Indeed, the significant dehydration effects inherent in deep fat frying was believed to be detrimental to the intermediate moisture character of such foods. More importantly, the submersion of intermediate-moisture foods in a deep fat frying medium held at relatively high temperatures was expected to effect an infusion and/or replacement of the moisture and/or preserving ingredients within the intermediate-moisture food with the oil or fat of the frying process and to therefore alter the delicate stability requirements requisite for achieving shelf stability without resort to sterilization or refrigeration.

SUMMARY OF THE INVENTION

The present invention comprises a process for preparing an intermediate-moisture animal food which comprises mixing proteinaceous meaty materials and water soluble solutes in an amount sufficient to achieve bacteriostasis, forming the mixture into a desired shape and then deep fat frying the shaped mixture to cook the meaty material contained therein. The moisture content of the meaty material/water soluble mixture prior to deep fat frying should be within the range of 15 to 60%.

The deep fat frying conditions are so regulated as to effect as minimal a dehydration of the product as possible. Typically, there will be a loss of from 2 to 5% moisture by reason of the deep frying step. Such minimal losses can be easily compensated for by adjustment of the initial formula prior to the cooking operation. The medium for the deep frying operation can be any animal or vegetable fat or oil which is liquid at the temperatures of cooking, which temperatures are typically in the range of 250° to 350° F. Importantly, the deep fat frying effects a surface coating of fat on the intermediate-moisture animal food which coating has been found to enhance and improve the palatability or acceptability of the product to animals or pets.

The key to the present invention is the unexpected discovery that a formulated intermediate-moisture animal food can be heated to pasteurize and cook the materials contained therein by a deep fat frying process which, as will be discussed in more detail, necessitates an emersion time generally, in excess of 2 minutes, without significantly dehydrating the intermediate-moisture product and without effecting a replacement or alteration of the water and/or water soluble solutes and their ratio to the matrix materials necessary to achieve the requisite shelf stability without the need for sterilized packaging techniques or refrigerated storage.

DETAILED DESCRIPTION OF THE INVENTION

The field of the present invention relates to intermediate-moisture animal foods, which foods are well-known in the art. Examples of such products may be found in U.S. Pat. Nos. 3,202,514 to Burgess et al.; 3,482,985 Burgess et al.; 3,615,652 to Burgess et al.; 3,380,832 to Bone; which patents are expressly incorporated herein by reference. Other examples of intermediate-moisture pet food formulations may be found in Bristis Pat. specification No. 1,290,811, complete specification published Sept. 27, 1972.

In general, the formulation of such foods involves the mixture of source materials, including proteinaceous meaty materials such as raw meat, meat by-products or meat meal and preferably further including a vegetable protein source and optionally a desired amount of farinaceous material such as wheat, corn and the flours thereof. The moisture from these materials or added moisture yields a basic matrix of from 15 to 60% water by weight. This moist matrix is, of course, capable and particularly susceptible of supporting microbial growth. Such products are, however, rendered shelf-stable by incorporation therein of water soluble or dispersible solutes which solutes effect a rise in the osmotic pressure of the water in which they are dissolved and, hence, achieve bacteriostasis in the final product. Typically, this condition is expressed in terms of the water activity or $A_w$ of the product which is the ratio of the vapor pressure of the water contained in said product to the vapor pressure of pure water measured at the same temperature. Typically, the $A_w$ of an intermediate-moisture animal food product will be less than 0.92 and preferably below 0.90. While such a water activity will generally afford protection against the growth of bacteria and yeast, it is the general practice in the art and the preferred technique to include in intimate contact with the intermediate moisture food an antimicrobial agent or agents to insure that the product is kept in a microbial free condition. Typically, the antimicrobial agent will be in the form of an antimycotic which specifically will act against possible mold growth. Examples of such antimycotics may be found in U.S. Pat. No. 3,202,514 to Burgess et al.; a preferred antimycotic is sorbic acid and its salts, especially potassium sorbate.

The "water soluble" solutes used to achieve the vapor pressure lowering necessary to obtain an $A_w$ below 0.92 will typically be a low molecular weight material highly soluble in water. Examples of such materials are sugars as that term is defined in U.S. Pat. No. 3,202,514 to Burgess et al.; propylene or butylene glycol; and polyhydric alcohols as that term is defined in U.S. Pat. No. 3,741,774, which definitions are expressly incorporated herein by reference. Preferred among the polyhydric alcohols is glycerol. Various other materials may be employed such as will form a colloidal suspension with the product's water, these materials acting typically in concert with truly water soluble materials. Examples of such materials are dextrinized starches, hydrophillic colloids, e.g. gums, gelatin, and the like. The term "water soluble solutes" as used herein is intended to encompass such materials.

In the process of this invention, a departure is made from the typical prior art processes for preparing intermediate-moisture animal or pet foods. According to the process of this invention, the proteinaceous meaty material together with any supplemental proteinaceous or farinaceous material is not subjected to any cooking step prior to inclusion of the water soluble solutes and forming of the final product. Of course, it will be recognized by those skilled in the art that materials such as meat meals by definition are subjected to some heating step to effect dehydration to the meal state. However, apart from such a step the source materials of the present invention are not subjected to any degree of cooking prior to complete formulation and shaping of the product. After forming the intermediate-moisture formulation into a desired shape, the pasteurization or cooking step is achieved through the use of deep fat frying. According to this invention, it has been found that to effect the desired degree of cooking, it is necessary to subject the final product to a deep fat frying process in which product temperatures above 140° F and preferably between 150° and 250° F are achieved. The actual cooking time depends upon the size, shape, and weight of the meat piece as well as the temperatures employed in the deep fat frying medium. For example, 15 grams of an intermediate-moisture animal food piece in the form of a meatball having a ¾ inch diameter will reach a temperature of about 150° F after about 3 minutes in 300° F oil. In general, however, process times of less than 1 minute and preferably 1½ to 2 minutes are not satisfactory for achieving the requisite degree of cook unless extremely high fat or oil temperatures are used which may in turn be detrimental to the intermediate-moisture food. Conversely, cooking to such product temperatures in excess of, say 4 to 5 minutes may detract from the palatability of the product and, importantly, to effect a degree of dehydration in significant amounts to alter the stability criteria achieved prior to cooking; and, to effect a significant enough replacement of the water or water soluble solutes with the fat or oil of the deep frying process to alter the stability system.

The cooking by deep fat frying may be accomplished in any suitable deep fat frying apparatus which are of course well-known in the art. The deep fat frying medium may be any animal or vegetable fat or oil which will be liquid at the temperatures at which the deep fat frying process is conducted. Preferred among these materials are animal fats such as bleachable fancy tallow and oils such as peanut oil, corn oil, cottonseed oil and the like. An antioxidant such as ascorbic acid, BHT, etc., may be added to the cooking medium.

As previously mentioned, the degree of dehydration of the intermediate-moisture formulated product is relatively insignificant when practicing the present invention and need not be compensated for when formulating the product prior to shaping and cooking. However, where it is deemed necessary to achieve equivalence between the formulated moisture and the moisture content of the product after deep fat frying, the degree of dehydration effected by the process is such as to make compensation for it a simple matter of adding excess moisture to the formulated product prior to cooking. Alternatively, ingredients may be added or increased which reduce or minimize moisture transfer or dehydration. Preferred among these ingredients are starch or starch-containing materials.

The amount of water soluble solute material needed to achieve bacteriostasis is a figure which is easily arrived at by those skilled in the art, the relationship between materials and their "water binding" or $A_w$ lowering effect being well-known. For example where sugar is the primary soluble solute, it is generally necessary to have that component present in an amount relatively close to the moisture content of the final product. On the other hand, where polyhydric alcohols or propylene glycol are the major solutes employed, it has been found that a 50% moisture product can be rendered shelf-stable by the inclusion of less than 20% of these materials together, of course, with an edible antimicrobial agent such as potassium sorbate.

The moisture content of the intermediate-moisture mixture is generally from 15 to 60%. Much, if not all, of the water is obtained from the natural ingredients, especially the meat, but the overt addition of water may be necessary in some cases especially where meat or bone meals are a major portion of the source ingredients. Moisture contents will be in the 15–30% ranges for many products. More preferably, product moistures in the 35 to 60% range, especially between 35 to 45% are utilized.

The pH of the product is typically neutral, i.e., in the range of from 5.5 to 8.0, preferably 5.8.

The best mode of practicing the present invention is as follows:

The following ingredients were utilized in preparing an intermediate-moisture animal food product.

| Ingredients | % by Weight |
|---|---|
| Meat | 61.5 |
| Glycerin | 9.0 |
| Propylene glycol | 8.8 |
| Corn flour | 7.7 |
| Dextrose | 4.0 |
| Soy concentrate | 3.0 |
| Sodium chloride | 1.3 |
| Potassium sorbate | 0.4 |
| Water | 0.3 |
| Mineral supplement | 2.2 |
| Soy isolate, colorings, flavorings, vitamins, minerals | 1.8 |

The meat, glycerin, propylene glycol and water; and the remaining ingredients were first separately premixed at ambient conditions. The mixtures were then blended together to form a raw matrix and the matrix was then formed into discrete round pieces using an Accupat former, the meatball-like pieces having a diameter of about 3/4 inches and a weight of 15 grams. The moisture content of the raw matrix was about 43% by weight and had an $A_w$ of about 0.92.

The pieces were then deep fat fried at 300° F for a period of 3 minutes employing corn oil. The resulting product had a unique texture and appearance in that a fat coating was present on the surface of the product, the exterior of the product was somewhat crisp to the touch while the interior of the product was soft and meaty. The moisture content of the cooked product was about 38% by weight and the product had an $A_w$ of about 0.88. An extended storage study conducted on this product indicated that it was completely shelf-stable after storage at ambient conditions for 6 months.

It will be understood by those skilled in the art that the specific conditions, intermediate-moisture food formulations, and the example used to illustrate the process of this invention are exemplary only and are not intended to limit the scope of the present invention. Various modifications and alterations are believed ascertainable without departing from the scope and spirit of the present invention. It is further to be understood that while the preferred environment of this invention is for animals or pets, the process herein is equally applicable to human food formulations.

Having thus described my invention what is claimed is:

1. A process for preparing a shelf-stable intermediate-moisture animal food product comprising forming a mixture comprised of uncooked proteinaceous meaty material, an edible antimicrobial agent or agents, and sufficient water soluble solutes to impart bacteriostasis to said mixture, the moisture content of said mixture being between 15 to 60% by weight, the $A_w$ of said mixture being below about 0.92, forming said mixture into a desired shape, and deep fat frying said mixture in fat at a temperature of from 250° F to 350° F for a period of time sufficient to raise the product to a temperature in excess of 140° F.

2. The process of claim 1 wherein said temperature is in excess of 150° F.

3. The process of claim 2 wherein said temperature is from 150° to 250° F.

4. The process of claim 3 wherein the deep fat frying time is in excess of 1½ minutes.

5. The process of claim 4 wherein said time is from about 2 to about 4 minutes.

6. The process of claim 5 wherein said deep fat frying medium is a vegetable oil.

7. The process of claim 6 wherein said oil is corn oil.

8. The process of claim 5 wherein said deep fat frying medium is a liquid animal fat.

9. The process of claim 5 wherein said moisture content of said mixture is between 15 to 30% by weight.

10. The process of claim 5 wherein said moisture content of said mixture is between 35 to 60% by weight.

11. The process of claim 10 wherein said moisture content is from 35 to 45%.

12. The process of claim 1 wherein said antimicrobial agent is an antimycotic.

13. The process of claim 12 wherein said antimycotic is potassium sorbate.

* * * * *